UNITED STATES PATENT OFFICE.

WILLIAM STONE WEEDON, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

DISSOLVED CARBOHYDRATE ESTERS AND PROCESS OF MAKING THE SAME.

1,082,573.  Specification of Letters Patent.  Patented Dec. 30, 1913.

No Drawing.  Application filed June 27, 1912.  Serial No. 706,197.

*To all whom it may concern:*

Be it known that I, WILLIAM S. WEEDON, of Wilmington, in the county of Newcastle, and in the State of Delaware, have invented a certain new and useful Improvement in Dissolved Carbohydrate Esters and Processes of Making the Same, and do hereby declare that the following is a full, clear, and exact description thereof.

My invention relates to solutions of carbohydrate esters such as nitrated carbohydrates, and methods of producing the same.

My invention is applicable to use in any one of the many different industries in which carbohydrate esters, and especially pyroxylin, are utilized. It is especially useful in those industries in which it is desired to produce a body or surface of pyroxylin having a required form.

The object of my invention is to provide a new solution of carbohydrate esters such as nitrated carbohydrates, and especially of pyroxylin, having properties different from previously known solutions of these compounds.

The solvents which form the particular subject matter of my invention are those belonging to the group of aliphatic aldehyde alcohols. While any one of the members of this group of carbon compounds comes within the scope of my invention, I preferably employ the particular aldehyde alcohol known as acetaldol and having the following formula:

$$CH_3.CHOH.CH_2.CHO.$$

This compound is readily produced by the condensation of two molecules of acetaldehyde, and acetaldehyde is readily obtained from ethyl alcohol, which latter is a common article of commerce readily obtainable in the market at a low price. Acetaldol is a colorless liquid soluble in water, having about the viscosity of a 50% glycerin solution. Its boiling point is about 82°, under a pressure of 20 mm., and it does not begin to decompose until it is subjected to a much higher temperature. I have discovered that one of the aldehyde alcohols, such, for example, as acetaldol, dissolves nitrated carbohydrates and derivatives of the same, and especially pyroxylin. The solution is much more readily effected by the application of heat.

As one illustrative embodiment of my invention, I produce a solution of pyroxylin by the addition of acetaldol to a quantity of the pyroxylin. Upon the application of heat the solution is readily effected, and a soft or jelly-like mass is produced, the viscosity of which varies according to the percentage of acetaldol used. This solution may be used for any purpose where it is desired to apply a pyroxylin jelly or plastic mass containing pyroxylin. Any other desired ingredients may be added to the composition to provide characteristics desired for the different industries in which dissolved pyroxylin is to be applied.

While I have indicated above that my invention comprises the use of any one of the aliphatic aldehyde alcohols, I have made reference particularly to acetaldol because of the fact that this particular substance can be, at the present time, more easily and more cheaply prepared than other aldehyde alcohols.

While I have described my invention above in detail, I wish it to be understood that many changes may be made therein without departing from the spirit of my invention.

I claim:

1. The process of producing a solution of a carbohydrate ester, which comprises dissolving it in an aldehyde alcohol.

2. The process of producing a solution of nitrocellulose, which comprises dissolving it in an aldehyde alcohol.

3. The process of producing a solution of pyroxylin, which comprises dissolving it in an aldehyde alcohol.

4. The process of producing a solution of a carbohydrate ester, which comprises dissolving it in acetaldol.

5. The process of producing a solution of nitrocellulose, which comprises dissolving it in acetaldol.

6. The process of producing a solution of pyroxylin, which comprises dissolving it in acetaldol.

7. A composition of matter comprising a carbohydrate ester dissolved in an aldehyde alcohol.

8. A composition of matter comprising nitrocellulose dissolved in an aldehyde alcohol.

9. A composition of matter comprising pyroxylin dissolved in an aldehyde alcohol.

10. A composition of matter comprising a carbohydrate ester dissolved in acetaldol.

11. A composition of matter comprising nitrocellulose dissolved in acetaldol.

12. A composition of matter comprising pyroxylin dissolved in acetaldol.

13. A composition of matter in the form of a jelly comprising pyroxylin dissolved in acetaldol.

In testimony that I claim the foregoing I have hereunto set my hand.

WILLIAM STONE WEEDON.

Witnesses:
MARY H. KRAFT,
CHAS. L. REESE.